US 6,721,234 B2

(12) United States Patent
Thomas

(10) Patent No.: US 6,721,234 B2
(45) Date of Patent: Apr. 13, 2004

(54) TEMPORAL AND SPECTRAL SPREAD SUBMARINE LOCATOR TRANSMITTER, AND METHOD AND INSTALLATION USING SAME

(75) Inventor: Hubert Thomas, Le Tholonet (FR)

(73) Assignee: Advanced Concepts & Systems Architecture, Meyreuil (FR)

( * ) Notice: Subject to any disclaimer, the term of this patent is extended or adjusted under 35 U.S.C. 154(b) by 0 days.

(21) Appl. No.: 10/221,101

(22) PCT Filed: Feb. 28, 2001

(86) PCT No.: PCT/FR01/00584
§ 371 (c)(1),
(2), (4) Date: Sep. 9, 2002

(87) PCT Pub. No.: WO01/69280
PCT Pub. Date: Sep. 20, 2001

(65) Prior Publication Data
US 2003/0039172 A1 Feb. 27, 2003

(30) Foreign Application Priority Data
Mar. 10, 2000 (FR) .............................................. 00 03127

(51) Int. Cl.[7] .............................. G01S 1/72; G01S 5/18
(52) U.S. Cl. ....................................................... 367/127
(58) Field of Search ................................ 367/124, 127, 367/129

(56) References Cited

U.S. PATENT DOCUMENTS

| 4,951,263 A | | 8/1990 | Shope |
| 5,896,304 A | | 4/1999 | Tiemann et al. |
| 6,157,592 A | * | 12/2000 | Kriz et al. .................. 367/127 |

FOREIGN PATENT DOCUMENTS

EP 0243240 A1 10/1987

* cited by examiner

Primary Examiner—Daniel T. Pihulic
(74) Attorney, Agent, or Firm—Sughrue Mion, PLLC

(57) ABSTRACT

The invention concerns a temporal and spectral submarine locating method, characterised in that it includes equipping the systems or mobile objects to be located and/or identified, with acoustic transmitters transmitting aperiodic signals with a predetermined pseudo-random sequence; deploying, over the working zone where the systems and moving objects to be located are found, one or several measuring points provided, each with an acoustic receiver, with a time scale reference and a measuring point locater; transmitting to a processing centre data derived from the measuring points where, at every time of detection on a given frequency band, precise dating is associated in a time scale referential with a position of the measuring point in a spatial referential; the whole set of data derived from the different measuring points being assembled at the processing centre to be operated on by level 2 correlation with the pseudo-random reference sequences corresponding to each of the searched transmitters.

9 Claims, 6 Drawing Sheets

TEMPORAL AND SPECTRAL SPREAD SUBMARINE LOCATOR TRANSMITTER, AND METHOD AND INSTALLATION USING SAME

BACKGROUND OF THE INVENTION

The invention concerns underwater tracking by acoustic waves, and more particularly transmitters carried by equipment or mobile units to be tracked and possibly to be identified. It also concerns a method and a facility to which such transmitters apply.

Various techniques are used in underwater tracking. In general, they use the propagation of acoustic waves.

A first method consists of providing the mobile unit to be tracked with a transceiver. At a regular rate the mobile unit interrogates beacons positioned on the bottom of the ocean. The measurement of the round trip propagation time of the acoustic waves, with a known velocity of sound in water, makes it possible to calculate the mobile unit-beacon distances. The coordinates of the beacons being known, the mobile unit is then tracked at the intersection of spheres centered on the beacons and radii equal to the propagation times divided by twice the velocity and corrected, if necessary, by a possible delay. This well-known technique is called tracking by the "long-baseline system."

Higher performance systems are used by military testing centers. These are torpedo trajectory tracking systems, for example. They are fixed or mobile. In both cases, the points of reception of the acoustic signals are hydrophones located either close to the bottom of the ocean, or suspended from buoys. THOMSON-CSF's European patent No. 0 243 240 describes such a device. The mobile units whose trajectory is to be tracked are provided with acoustic transmitters. Periodically, every 500 ms., for example, they transmit pulse strings chosen from between two frequencies (a technique called SFSK [Sinusoidal Frequency Shift Keying] in English terminology).

Other transmitters used in trajectory tracking transmit a first pulse at a rate of 1 Hz, followed by a pulse offset by a constant factor and of a size proportional to the depth of the mobile unit. These transmitters can have a clock locked on to an external time reference prior to the launching of the mobile unit. They are then called synchronous.

Also known are acoustic transmitters designed to locate the black boxes of aircraft sunk in the ocean. They transmit pure 37.5 kHz pulses which, although they make it possible to be guided toward the source, do not enable them to be identified. Indeed, the box's transmitter containing the voice recordings transmits the same signals as the box containing the information relative to the flight's parameters. This results in a complication of the search and recovery operations.

Existing transmitters have numerous limitations, especially when numerous mobile units to be tracked by trajectory are present simultaneously in the water. This is the case particularly for a group of underwater divers. In effect, the simultaneous reception, by the same hydrophone, of acoustic pulses from different mobile units poses detection problems. Included among those problems but not limited hereto are: the poor adjustment of the automatic gain control loop of the preamplifiers, wave interference phenomena that result from fading or a glut of signals.

Moreover, not only the interference between the direct waves should be taken into consideration, but also interference with multiple trajectories frequently encountered in shallow and medium-depth waters. They are related to the multiple reflections of the signals on the bottom and surface of the ocean.

Consider, for example, tracking a team of 2, 4 or 8 divers by using a device involving four buoys located at the surface, stabilized by anchoring, in a square configuration of 1000 meters per side. The divers are fitted with conventional transmitters each of which transmits on its own frequency two acoustic pulses, one synchronous with a time reference (the GPS time, for example), the other making it possible to encode his depth according to the procedure described previously. For example, when this pulse is transmitted with a delay of 45 milliseconds, it corresponds to a depth of 30 meters. The following table presents the probability of detecting without interference the first transmission of a given diver on at least three buoys, which is the minimum number required to locate the diver without ambiguity using X-Y coordinates.

| Probability | Grid Cell 5 m | Grid Cell 50 m | Grid Cell 500 m | Grid Cell 1000 m |
|---|---|---|---|---|
| 2 divers | 0% | 30% | 95% | 97% |
| 4 divers | 0% | 2% | 65% | 85% |
| 8 divers | 0% | 0% | 30% | 60% |

Columns show different grid cell sizes.

A grid cell of 500 m means that the divers are randomly distributed in a volume of 500 m×500 m, with a depth of between 20 and 40 meters.

In the calculation, the multiple trajectory phenomena are assumed to create interference for a duration of 10 milliseconds following the end of the transmission of an acoustic pulse of 5 milliseconds duration.

The table above shows that it is very difficult to locate divers, at a high rate, when they are grouped together inside a small volume and use synchronous transmitters that have an identical transmission recurrence for all of the divers.

In general, the problem posed consists of making it possible to track and identify a set of underwater objects or mobile units, and do so accurately, without ambiguity, and regardless of the position of the mobile units with respect to each other and with respect to the detection hydrophones. Moreover, the cost of manufacturing these transmitters should be low.

SUMMARY OF THE INVENTION

The acoustic tracking transmitters covered by the present invention are characterized by the fact that they have electronic circuits that generate aperiodic pulsed acoustic signals, the transmission dates of which are distributed according to a known, predetermined pseudo-random sequence, both at the transmission equipment itself, as well as at the receiving equipment or processing center.

According to another characteristic, said electronic circuits are configured so that the aperiodic pseudo-random sequence of pulses they generate is a sequence of signals encoded by hops in wide or narrow frequency bands, according to an order that is predetermined and known, both at the transmission equipment itself, as well as at the receiving equipment or processing center.

The facility according to the invention is notable by the fact that it comprises:

transmitters suitable for generating a periodic pulsed acoustic signals, integrated into equipment or mobile units to be tracked and/or identified;

one or more points of measurement provided with an acoustic receiver, a time scale reference and a means of tracking said point of measurement;

and one or more processing centers that make it possible to identify the transmitters by level 2 correlation calculations between a series of moments of reception of pulses and the pseudo-random sequences peculiar to each transmitter.

Alternatively, the point(s) of measurement can be fixed and previously tracked by any means of positioning in a local or geographic referential system.

The method of the invention is notable in that the equipment or mobile units to be tracked and/or identified are equipped with acoustic transmitters transmitting aperiodic pulsed acoustic signals according to a predetermined pseudo-random sequence; in the work area where the equipment or mobile units to be tracked are located, one or more points of measurement are deployed, each of which points is provided with an acoustic receiver, a time scale reference and a means of tracking said point of measurement; the information produced by the points of measurement is transmitted to a processing center where, at each moment of detection on a given frequency band, it is associated with a precise dating in a time scale referential system and a position of said point of measurement in a spatial referential system; all of this information from different points of measurement is collected at said processing center so that it can be processed by level 2 correlation with the pseudo-random reference sequences pertaining to each of the transmitters being sought.

Alternatively, the level 2 correlation processing can be done at the point(s) of measurement.

As will be seen further on, in the description of one form of embodiment, one particular solution to the problem posed consists of having each mobile unit transmit cyclically a series of pulsed and aperiodic acoustic signals.

BRIEF DESCRIPTION OF THE DRAWINGS

The invention will be better understood and other characteristics will become apparent from the following description, with reference to the attached figures.

DETAILED DESCRIPTION OF THE INVENTION

The table provided above shows the probabilities of detection of an acoustic transmission produced by a transmitter at at least three points of reception, with no interference, using conventional trajectory tracking transmitters used in synchronous mode.

In general, the means of tracking underwater mobile units, using the transmitters covered by the present invention, is comprised of a set of widely spaced receiving points. In the following discussion, we will assume that these receiving points are comprised of hydrophones [suspended] vertically from buoys. The points of reception have electronics for detection and tracking of said point of reception.

Figure 1:
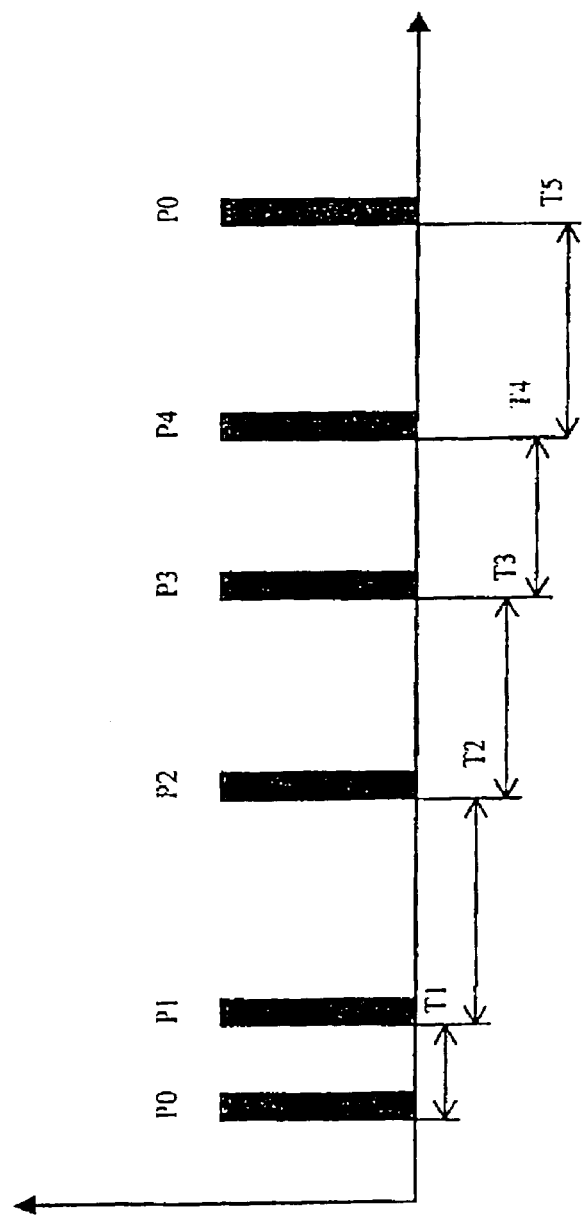
FIG. 1 represents the time sequencing of the transmitted pulses.

FIG. 1 shows an example of pseudo-random sequencing of temporal spread pulses P0 to P4. In this particular case, 5 pulses are transmitted cyclically. They are characterized by the time intervals T1, T2 to T5 separating each transmission.

Figure 2:
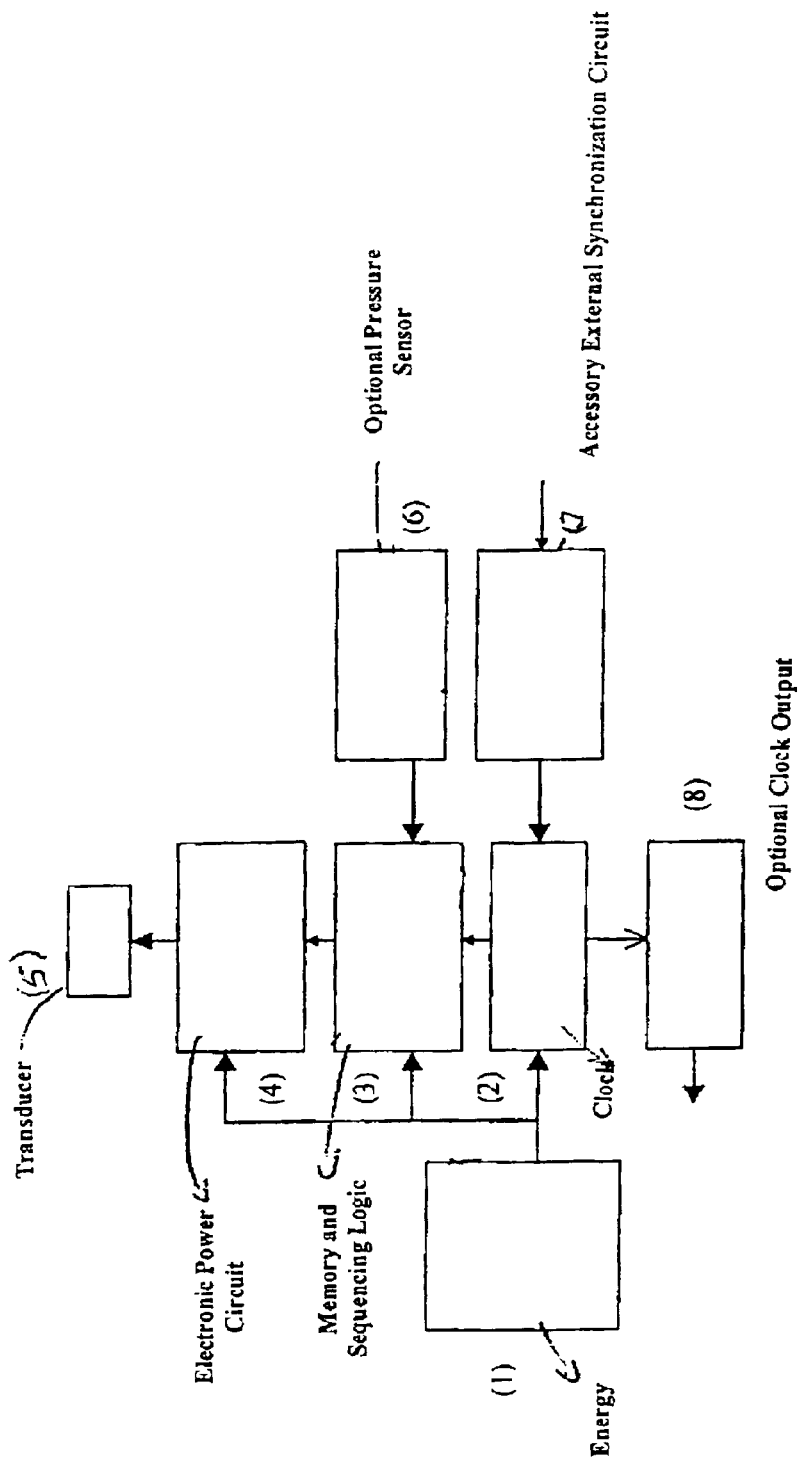
FIG. 2 represents a flow chart of a transmitter of pulsed and aperiodic acoustic signals.

In FIG. 2 there is an energy source (1), such as a battery, a clock circuit (2), which could be quartz, a memory (3) in which are stored or calculated the time intervals, $t_i$ separating each transmission and a logic circuit for sequencing said transmissions. The circuit (4) represents the power transmission stage that enables a high voltage to be generated to activate the transmission transducer (5), in general a piezoelectric ceramic. A pressure sensor (6) can be integrated into the unit. It is then used for depth telemetry by interleaving into the first sequence of pulse transmissions a second sequence using another pseudo-random sequencing, offset from the first by a time proportional to the depth of the mobile unit. An external synchronization circuit (7) makes it possible, if necessary, to synchronize the clock (2) to a common time scale reference shared by the transmitter and the receivers. An optional output (8) of the time reference can be used for marking measurements used by another device not represented.

Figure 3:
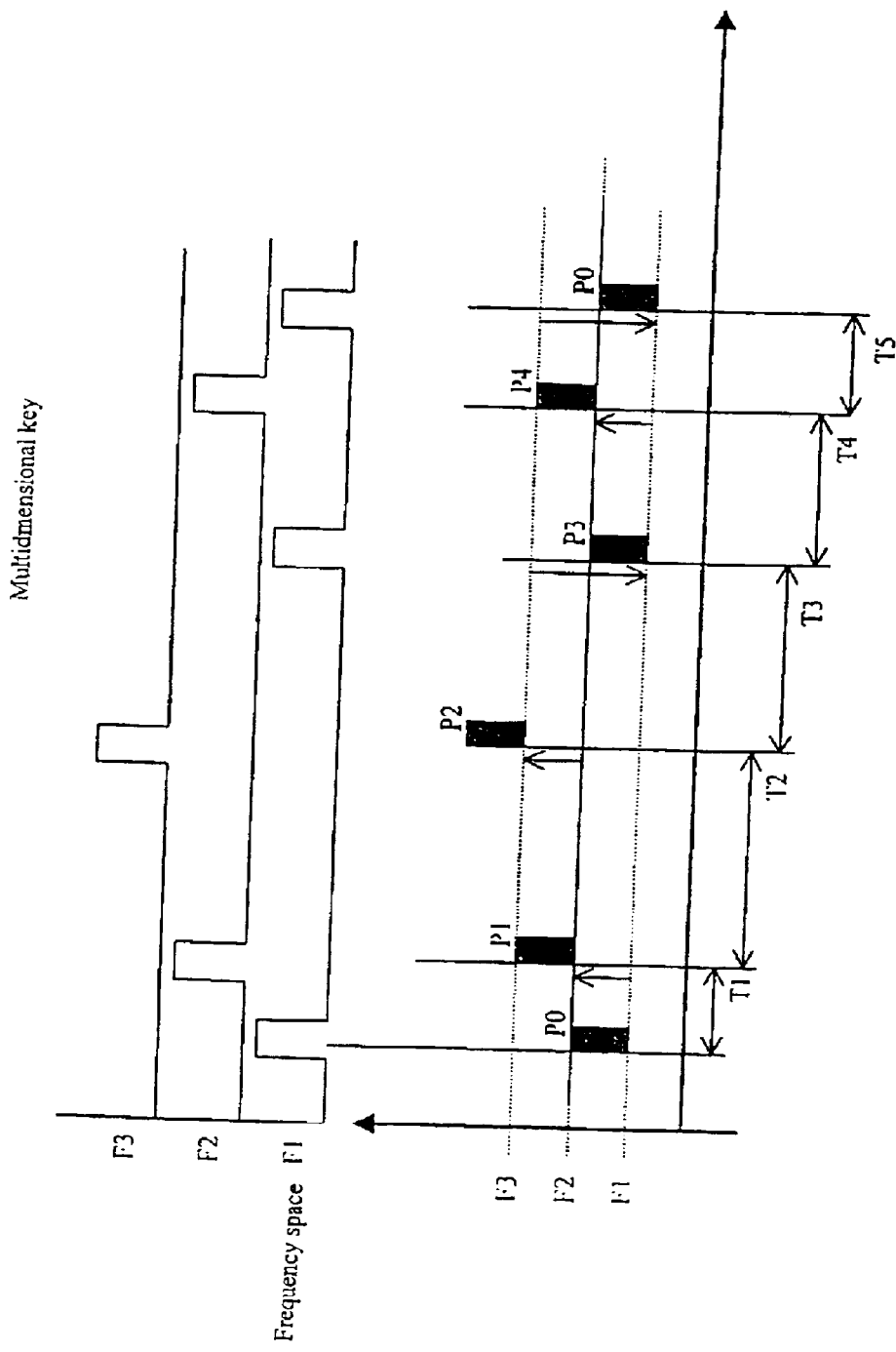
FIG. 3 represents the spatial spread of the transmitted pulses.

FIG. 3 represents in time/frequency space the combination of the temporal spread of the pulsed codes T1 to T5 and pseudo-random hops in the spacing of frequencies F1 to F3. The result is a frequency as well as temporal spread of the transmitted codes, producing a very large diversity in the choice of codings. They are characterized by a multidimensional (time and frequency) key.

Figure 4:
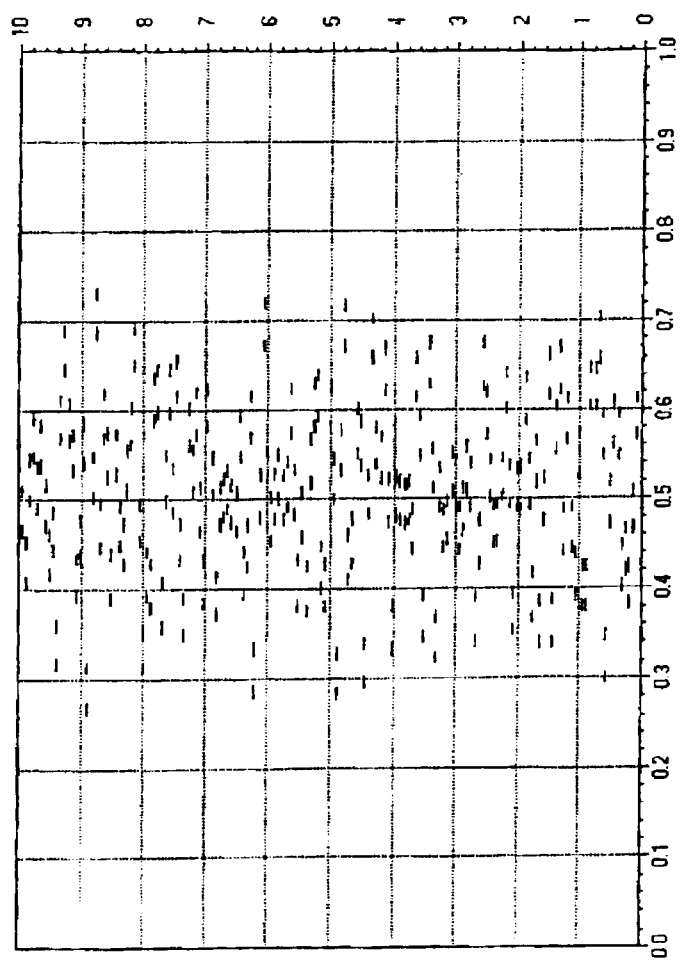
FIG. 4 represents the temporal occupancy of the codes transmitted using conventional trajectory tracking transmitters used in synchronous mode.

FIG. 4 represents what the temporal occupancy would be of signals transmitted by a group of four underwater divers if they were working inside a square 500 meters on a side, each of them having a conventional transmitter sharing a common time reference and having a depth telemetry device. The concentration of the signals within the 0.3 to 0.7 second interval is the cause of the collisions between the signals and explains the small probability of detection without interference on at least three points of measurement. The horizontal axis of the figure represents, in a cycle of one second, the moments of arrival of the signals transmitted by the divers at four buoys located at the four corners of a square 1000 meters on a side. The vertical axis represents a succession of 10 transmission cycles offset by one second.

Figure 5:
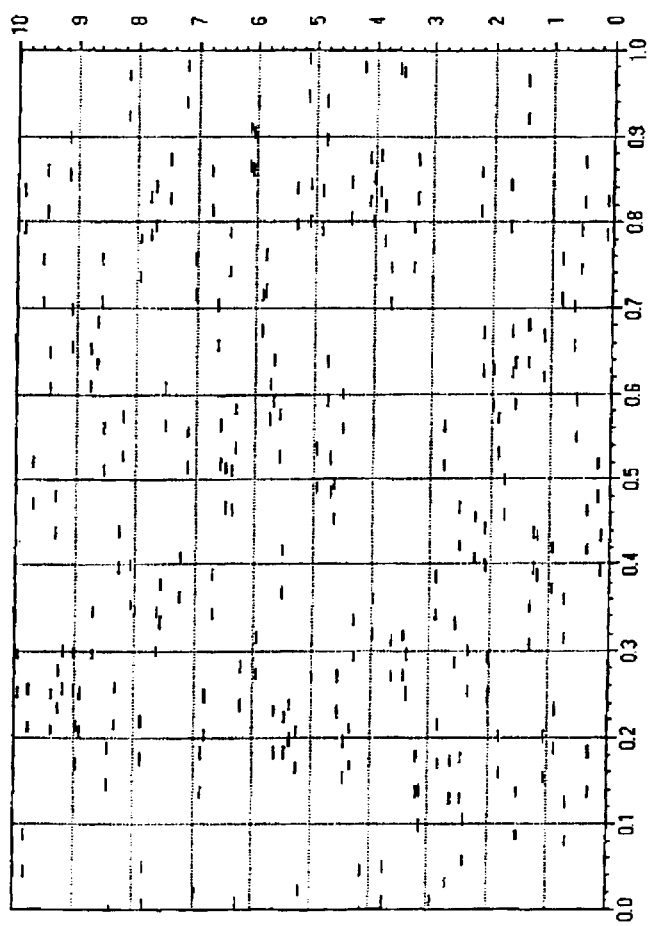
FIG. 5 represents the temporal occupancy of pulses transmitted using the temporal spread method that is an object of the present invention.

FIG. 5, representative of the invention, shows what the temporal occupancy would be of pulsed signals transmitted by a group of four underwater divers if they were working within a square 500 meters on a side, each of them having a transmitter according to the invention, furnished with the device for the temporal spread of the transmitted codes. The result is a distribution of codes transmitted over the entire 0–1 second space. There is therefore only a slight probability of collision of the signals at the receivers. The horizontal and vertical axes of this figure have the same meaning as those in FIG. 4.

Figure 6:
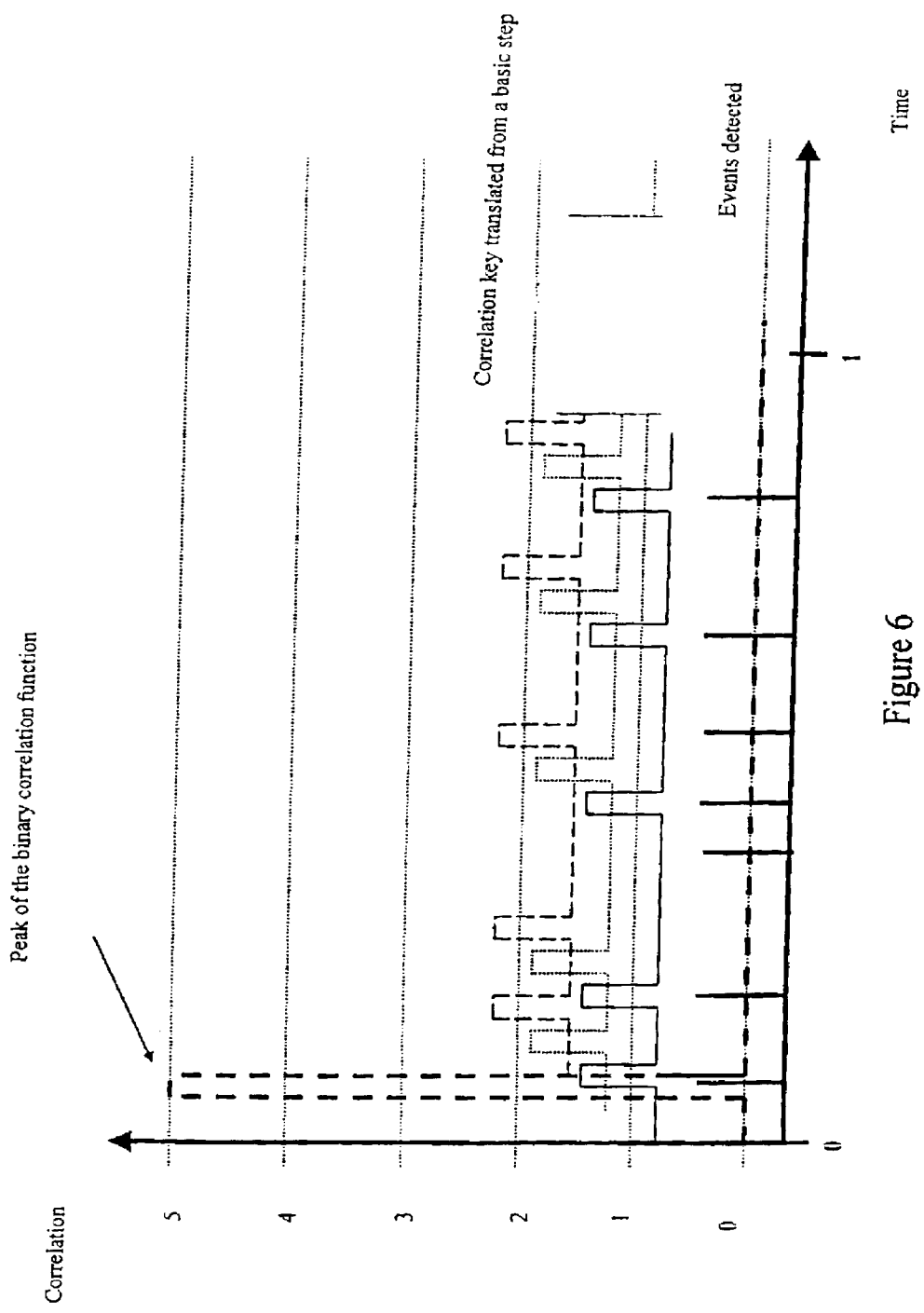
FIG. 6 represents the decoding key.

FIG. 6 presents the decoding key corresponding to a sequence of pulsed codes transmitted by a transmitter using only one frequency band. The width of each element of the key is determined in order to take into account the fluctuations of the arrival moments related to the variations in speed of the transmitter during the period of time in question. The detection is accomplished by correlation between the key and the signal detection peaks in the frequency band in question. The value of the correlation function takes discrete values varying from 0 to a maximum of "n," "n" being the maximum number of transmitted codes that can be detected inside the observation window. This correlation function is called level 2, in contrast with level 1 correlation that could have been used to detect each individual pulse.

FIG. 3 presents a multidimensional key F1, F2, F3 corresponding to a coding that is also spread over three distinct frequency bands.

The use of acoustic transmitters transmitting aperiodic pulsed signals in a predetermined pseudo-random sequence, an object of the present invention, has the following advantages:

Because of the technologies of electronic components such as PICs, the manufacture of transmitters having the ability to transmit aperiodic pulsed signals is inexpensive.

By fixing a different pseudo-random sequence in a non-volatile memory of each transmitter, it is then very easy at the receiver to identify the transmitter as well as to date the moment of reception of a series of codes with respect to a timing reference; moreover, this is done without ambiguity of cycle number or origin of the source. This is absolutely not the case today with the aircraft black box transmitters that transmit on the same frequency and at the same time interval. This unique characteristic provides the valuable possibility of differentiating between transmitters, and thus the item to which it is attached. This can prove useful in distinguishing items that are lost on the bottom of the ocean (containers of dangerous chemicals, nuclear materials, weapons, etc.) and thus enable them to be recovered in accordance with different priorities.

The probability that a peak of the level 2 correlation will not correspond to the selected mobile unit is extremely low. There is therefore an excellent probability of simultaneous detection at several points of reception of the pseudo-random sequences of impulses corresponding to a large number of mobile units present in a given area, even if said area is small in size.

Because of the very large number of different pseudo-random sequences that can be generated, the detection of noise instead of a real signal, as well as the non-detection of a real signal, has little influence on the results of the calculation of the level 2 correlation. The result is a very high insensitivity to ambient noise, decoys, as well as deliberate jamming.

Moreover, by acting only on the aperiodic aspect of the transmitters, it becomes possible to improve search equipment while preserving compatibility with existing relocation equipment that is based on purely directional measurements.

Equipment to be tracked and/or identified is equipped with acoustic transmitters, transmitting aperiodic pulsed signals according to a predetermined pseudo-random sequence.

In the work area where the equipment to be tracked is located, one or more points of measurement are deployed, furnished with an acoustic receiver, a time scale reference and a means of tracking said point of measurement. The points of measurement and/or the processing center(s) are arranged on the surface, or immersed in the water, or at the bottom of the ocean, fixed, or drifting, or movable.

The information from the points of measurement is transmitted to a processing center where, at each moment of detection on a channel of the arrival of a pulse (represented by a given frequency band), a precise dating is associated within a time scale reference system and a position of said point of measurement within a space reference system.

All of this information from different points of measurement is collected at said processing center in order to process it by level 2 correlation with the reference pseudo-random sequences corresponding to each of the transmitters sought.

The sole existence of a maximum of the level 2 correlation function, as previously defined, above a given threshold, makes it possible both to be certain of the presence of transmitter in the area, as well as to identify it.

A propagation time of the signals transmitted toward the receiver corresponds to the peak of each level 2 correlation function.

Based on all of the propagation times of the signals correlated to different receivers corresponding to a same cycle of transmissions, it is then possible to calculate the position of the mobile unit by using well-known tracking algorithms called "circular" or "hyperbolic," depending on whether or not the time scale reference of the transmitter is synchronous with the time scale reference of the receivers.

Thus, the position of the transmitters can be determined with precision, without ambiguity.

What is claimed is:

1. A plurality of acoustic tracking transmitters, transmitters having electronic circuits genereateing aperiodic acoustic pulsed signals, said transmitters each being associated with a respective movable object whose DOSitlon is to be tracked and the transmission times of the pulsed signals from each transmitter being distributed according to a respective pseduo-random sequence.

2. Acoustic tracking transmitters according to claim 1, characterized in that they have electronic circuits so that the aperiodic pseudo-random sequence of pulsed signals they generate is a sequence of pulsed signals encoded by hops in wide or narrow frequency bands, according to an order that corresponds to said pseudo-random sequence.

3. Acoustic tracking transmitters according to claim 1, characterized in that they have electronic circuits that enable one or more sequences of interleaved sequences of pulses to be transmitted for purposes of the remote transmission of the depth of the movable object or any other information.

4. An underwater tracking facility comprising acoustic tracking transmitters according to claim 1, integrated into equipment or mobile units to be tracked, characterized in that the underwater tracking facility has one or more points of measurement provided with an acoustic receiver, a time scale reference and a means of tracking said point of measurement, and one or more processing centers that make it possible to identify the transmitters by level 2 correlation calculations between a series of moments of reception of pulsed signals and the pseudo-random sequences peculiar to each transmitter.

5. A tracking facility according to claim 4, characterized in that the points of measurement are situated on the surfhce, immersed in the water or placed at the bottom of the ocean, fixed, drifting, or movable.

6. A tracking facility according to claim 4, characterized in that the points of measurement are fixed and of a position determined by any means of tracking in a local or geographic referential system.

7. An underwater tracking method by temporal and spectral spread, said method comprising the steps of:

transmitting aperiodic pulsed acoustic signals from acoustic transmitters located with equipment or mobile units to be tracked and/or identified, said acoustic transmitters transmitting their aperiodic pulsed acoustic signals according to respective different predetermined pseudo-random sequences;

receiving the transmitted pulsed acoustic signals at acoustic receivers located at one or more points of measurement in a work area where the equipment or mobile units to be tracked are located, each of said equipment or mobile units further having a time scale reference and a means of tracking said point of measurement; and transmitting information produced by the points of measurement to a processing center where, at each moment of detection on a given frequency band, it is associated with a precise dating in a time scale referential system and a position of said point of measurement in a spatial referential system; all of this information from different points of measurement being processed by level 2 correlation with reference pseudo-random sequences of pulses corresponding to each of said acoustic transmitters.

8. An underwater tracking method according to claim 7, characterized in that the points of measurement and/or the processing center(s) are arranged on the surface, immersed in the water, or at the bottom of the ocean, fixed, drifting, or movable.

9. An underwater tracking method according to claim 7, charactezized in that the level 2 correlation is performed at the point of measurement or at the processing center.

* * * * *

UNITED STATES PATENT AND TRADEMARK OFFICE
CERTIFICATE OF CORRECTION

PATENT NO. : 6,721,234 B2
DATED : April 13, 2004
INVENTOR(S) : Hubert Thomas

It is certified that error appears in the above-identified patent and that said Letters Patent is hereby corrected as shown below:

Column 6,
Line 28, delete "generateing" and insert -- generating --
Line 30, delete "DOSitlon" and insert -- position --
Line 33, delete "pseduo" and insert -- pseudo --
Line 57, delete "surfhce" and insert -- surface --

Column 8,
Line 12, delete "charactezized" and insert -- characterized --

Signed and Sealed this

Eighth Day of February, 2005

JON W. DUDAS
*Director of the United States Patent and Trademark Office*